(12) United States Patent
Morelos

(10) Patent No.: US 6,382,854 B2
(45) Date of Patent: May 7, 2002

(54) COMPUTER KEYBOARD ENHANCEMENT KIT

(76) Inventor: Rossana Uy Morelos, 14435 High Pine St., Poway, CA (US) 92064

( * ) Notice: Subject to any disclaimer, the term of this patent is extended or adjusted under 35 U.S.C. 154(b) by 0 days.

(21) Appl. No.: 09/738,509

(22) Filed: Dec. 18, 2000

Related U.S. Application Data

(60) Provisional application No. 60/172,179, filed on Dec. 17, 1999.

(51) Int. Cl.[7] .................................................. B41J 5/08
(52) U.S. Cl. ...................... 400/490; 400/714; 400/491; 434/231
(58) Field of Search ................................ 400/490, 491, 400/493, 495, 487, 472, 714; 235/145 A, 145 R, 146; 341/21, 22; 361/679, 680; 434/227, 231, 233

(56) References Cited

U.S. PATENT DOCUMENTS

| | | | | |
|---|---|---|---|---|
| 3,317,019 A | * | 5/1967 | Braune ........................ 400/490 |
| 4,536,160 A | * | 8/1985 | Hatfield ...................... 434/227 |
| 4,940,346 A | * | 7/1990 | Liljenquist .................. 400/487 |
| 5,089,690 A | * | 2/1992 | Okamura ................. 235/145 R |
| 5,096,317 A | * | 3/1992 | Phillippe ..................... 400/714 |
| 5,452,960 A | * | 9/1995 | Kuhlenschmidt ........... 400/487 |
| 5,514,855 A | * | 5/1996 | Sullivan .................. 235/145 R |
| 5,667,319 A | * | 9/1997 | Satloff ......................... 400/472 |

* cited by examiner

Primary Examiner—John S. Hilten
Assistant Examiner—Minh H. Chau

(57) ABSTRACT

A computer keyboard enhancement kit consists of detachable key replacements made to be larger and to have more shapes and colors than the letter keys of a standard computer keyboard so as to lessen the level of difficulty for children of preschool ages in locating such keys on the keyboard as they work on educational programs. Each of these key replacements takes a specific shape and color, and displays a specific letter that is on the keyboard in either uppercase or lowercase form. The shapes and colors follow a specific pattern scheme wherein the letters of the same hand and row keys have key replacements with the same color but with varied shapes. To be in use, these key replacements are attached to the top surface of a transparent plastic jacket that goes with the kit, and are positioned on top of their corresponding letter keys on the computer keyboard.

3 Claims, 4 Drawing Sheets

COMPUTER KEYBOARD ENHANCEMENT KIT

CROSS-REFERENCE TO RELATED APPLICATIONS

This application claims benefit of provisional application No. 60,172,179 filed Dec. 17, 1979.

BACKGROUND OF THE INVENTION

This utility model is basically a combination of a computer keyboard attachment, and a keyboard key replacement and identification system; but more specifically, is a computer keyboard enhancement kit.

We know for a fact that the computer is fast becoming an educational tool among children with ages 3 to 6. With the present proliferation, and availability of educational software in the market for these particular ages, the need for computers to be user-friendly for children becomes more apparent. Among the computer devices, the keyboard seems to be the least user-friendly as far as computing for children is concerned.

One feature of the computer keyboard mostly used by children when working on educational software is its letter keys. They are the keys that have the English letter symbols on them. With the letter symbols being in uppercase only, typing of lowercase letters for children can oftentimes be confusing especially if they have not fully mastered yet their letters. Having to press uppercase letters when they are given lowercase letters, and having to be familiar with where these uppercase letters are on the keyboard are just too much for children to handle at the same time when keyboarding. With regards to the keys' shapes and colors, they lack variety, thereby, making all the keys look the same and very hard to distinguish from each other. At the same time, they become so plain that they are unattractive and uninteresting for children to use. Likewise, with the keys being in the standard QWERTY layout which is very new from the ABC order that they are used to, children find locating of letters on the keyboard too stressful and too frustrating to achieve.

Many keyboards especially made for children may be available in the market but can be very costly. Their prices can cost double or even triple the prices of standard keyboards. Thus, they become an impractical investment since they are useful only while children are children. Besides, having so may cause inconvenience to those adults who share a computer system with children since they have to change to a standard keyboard everytime they need to work on their computer.

Several prior art inventions have been found to address the problems aforementioned but none of them actually possesses all the advantages this present invention has.

One of these prior art inventions is the children's computer keyboard by Kuhlenschmidt with U.S. Pat. No. 5,452,960 (1995). It includes color-coded, enlarged, square-shaped keys with enlarged characters but all the alphabet keys have the same color. Thus, the keys' colors and shapes are still not varied. It also includes an extension cord for the changing of keyboards. This means an additional purchase of keyboard has to be made aside from the standard keyboard normally used with the computer system.

Another is the computer keyboard educational toy of Hatfield with U.S. Pat. No. 4,536,160 (1985). It aims to teach small children alphanumeric characters and their positions on a conventional keyboard but still retains the standard keyboard-key shape.

There is also the keyboard assembly and typing method of Liljenquist with U.S. Pat. No. 4,940,346 (1990) which makes use of colors and shapes to form a visual pattern among keys, making association of a distinct visual pattern with each letter of the alphabet possible. However, the colors and shapes are on the keys and not of the keys. Thus, they occupy most of each key's surface, and make the letter symbols less visible for children to read.

With the computer keyboard system of Wen-Hung that has U.S. Pat. No. 5,954,437 (1999), it enables users to locate keys of letters, radicals, and phonetic symbols quickly but modifies only the keys' colors to differentiate them from each other. Thus, problems may still arise then when identifying those keys with the same color for there are no other distinguishing marks aside from the symbols on them. The same would be the case with the keyboard of Allen with U.S. Pat. No. 706,002 (1902) which has keys grouped and differentiated by colors suggestive of the characters embraced in the groups.

It is important to note that the above prior art inventions are all basically keyboards. None of them works as an attachment for a standard keyboard. With those that qualify under such classification, most of them merely serve to protect or cover the keyboard keys. Among them are: the keyboard guard of Willingham with U.S. Pat. No. 4,060,163 (1976); the computer key cover apparatus of Phillippe with U.S. Pat. No. 5,096,317 (1991); the computer keyboard cover of De Taboada with design U.S. Pat. No. 425,041 (1999); and the key-button cap of a typewriting machine of Sweeney with U.S. Pat. No. 1,530,146 (1923).

On the other hand, there are prior art inventions that work as attachments but serve other purposes than protecting the keyboard keys. Such are: the finger-key for typewriting and similar machines of Conklin with U.S. Pat. No. 956,485 (1910); and the replacement labels for keyboards of McLaughlin with U.S. Pat. No. 4,512,092 (1985). Both are primarily purposed to replace labels on the keys. The replacements though still take the shape of the keyboard keys. The one of Vickers which is a keyboard attachment for typing and computing machines with U.S. Pat. No. 1,673,724 (1925) aims to increase speed and avoid errors in operating keys but works more for those who can already read letters, numbers, and symbols.

BRIEF SUMMARY OF THE INVENTION

Therefore, it is the main purpose of this utility model to enhance for children with ages 3 to 6 the appearance of the keys on the computer keyboard, and make finding and remembering of keys for them easier, more fun, and more educational. The logical assignment of colors and shapes to the key replacements that go with the kit, and the availability of key replacements with either uppercase or lowercase letters on them lessen the level of difficulty for children when using the keys. Likewise, such features can benefit the adults supervising children on the computer. Giving directions to children with regard to letter location can be easier since the shape and color of the key that has the needed letter can be described.

Another purpose of this model is to provide a cheaper but more effective and more convenient alternative over buying a special keyboard for children's use on the computer. Instead of having to spend on one more keyboard aside from the regular keyboard that normally goes with the computer system, the jacket in the kit can easily be wrapped around, and removed from any computer keyboard anytime. The model may be designed to fit all sizes and shapes of computer keyboards there are in the market at present.

Likewise, this model is designed to have an activity in itself. Even if it is not being used for the computer keyboard, educational games can be performed with it to teach shapes, colors, letters, and patterns. It is for this reason that the key replacements are detachable.

One more purpose of this utility model is to serve as a protection for the keyboard keys from inevitable banging and careless pressing children do with them. Since the model can cover the whole keyboard, all the other keys aside from the letter keys get protected, too. Besides, the rubber pads at the bottom surface of the jacket enable children to practice pressing keys lightly.

Other purposes and advantages of this utility model will become evident upon reading the detailed description taken together with the accompanying drawings.

BRIEF DESCRIPTION OF THE SEVERAL VIEWS OF THE DRAWING

FIG. 1A shows the top surface of the jacket. FIG. 1B shows the bottom surface.

FIG. 2A shows the front view of the key replacements that have uppercase letters. FIG. 2B shows the front view of the key replacements that have lowercase letters.

DETAILED DESCRIPTION OF THE INVENTION

Figure 1A:
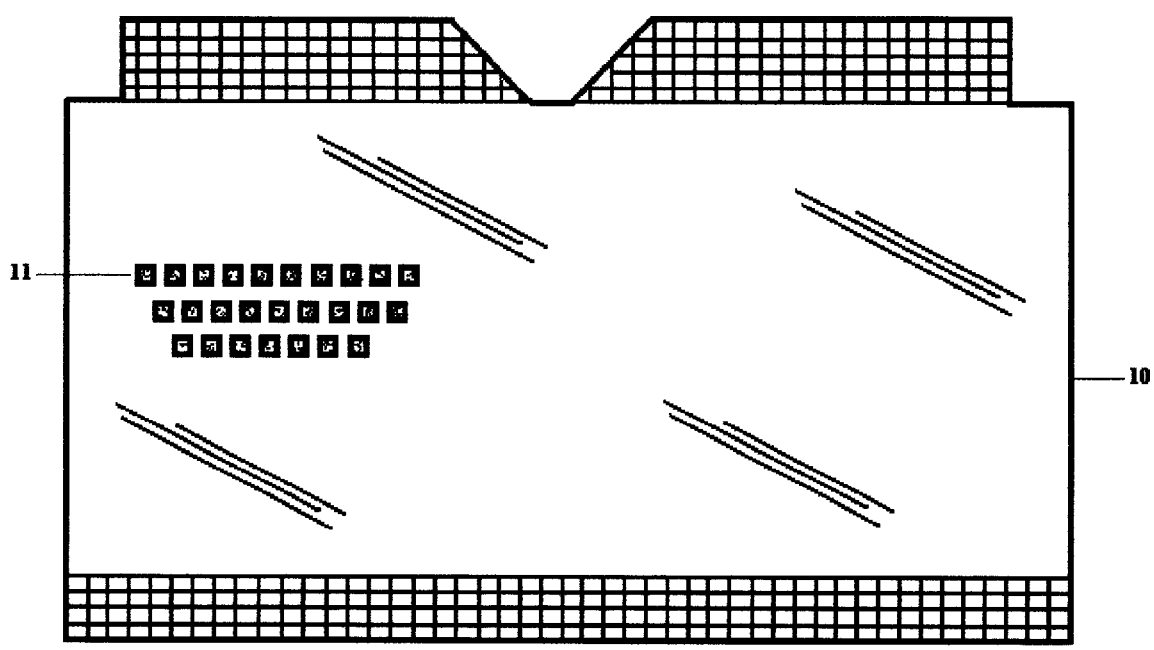
FIGS. 1A and 1B have the perspective views of the jacket unfolded, and sans the key replacements, and the adhesive pile strips and strips of tiny hooks for fastening.
Figure 1B:
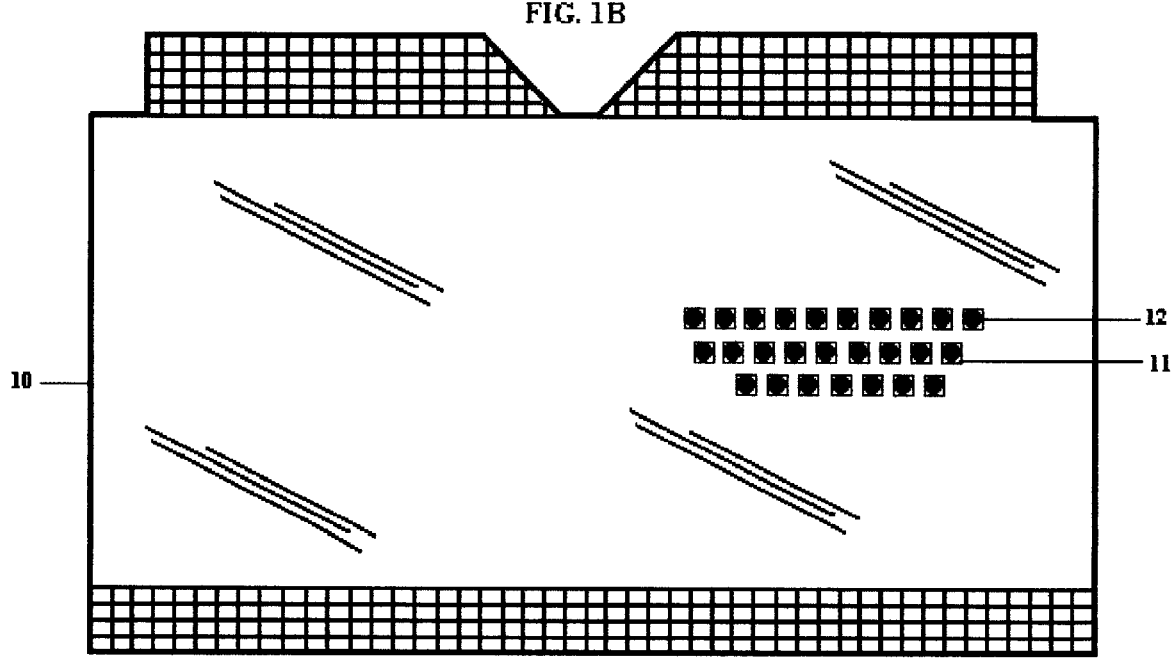

As shown in the drawings in FIGS. 1A and 1B, a computer keyboard enhancement kit includes a bib-shaped jacket made of transparent plastic sheet 10 having the width of a standard QWERTY computer keyboard and the length thrice of it; with reticulated lines preprinted on its upper front and lower back edges; and has on the middle left portion of its top surface twenty-six adhesive pile strips 11 attached permanently, each measuring approximately one-forth inch; and on the middle right portion of its bottom surface twenty-six rubber pads 12 also attached permanently, each measuring approximately one-fourth inch in width and at least one-eighth inch in thickness. The thickness of the pads is to avoid double striking of keys that are in adjacent rows.

Figure 2A:
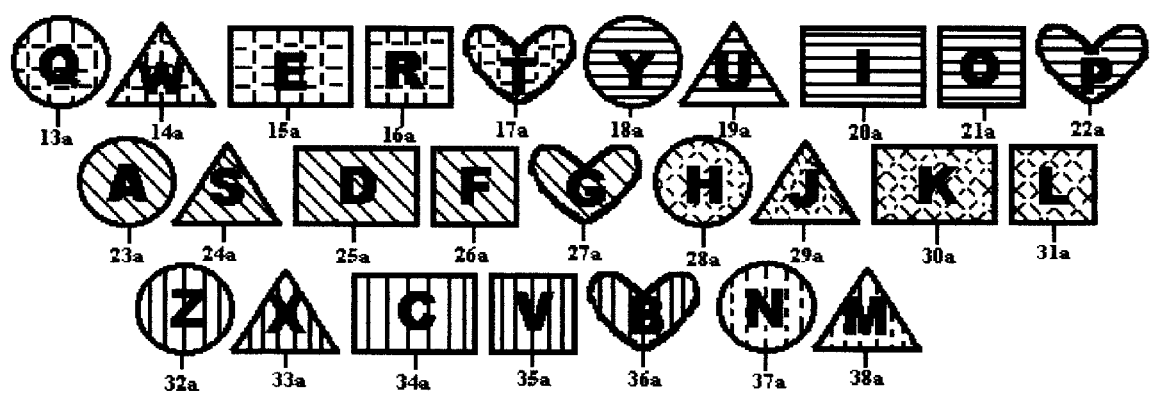
FIGS. 2A and 2B contain the detailed views of the arrangement of the key replacements as they appear on the jacket on a smaller scale.
Figure 2B:
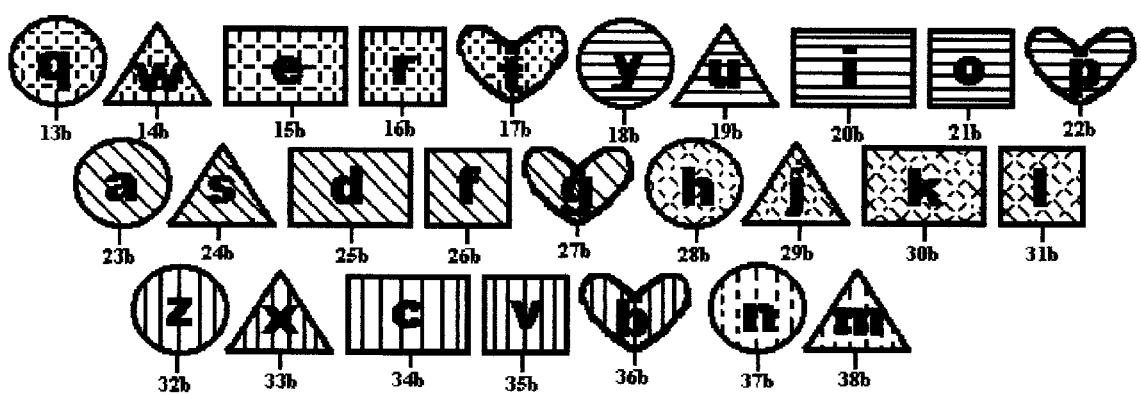
Figure 3:
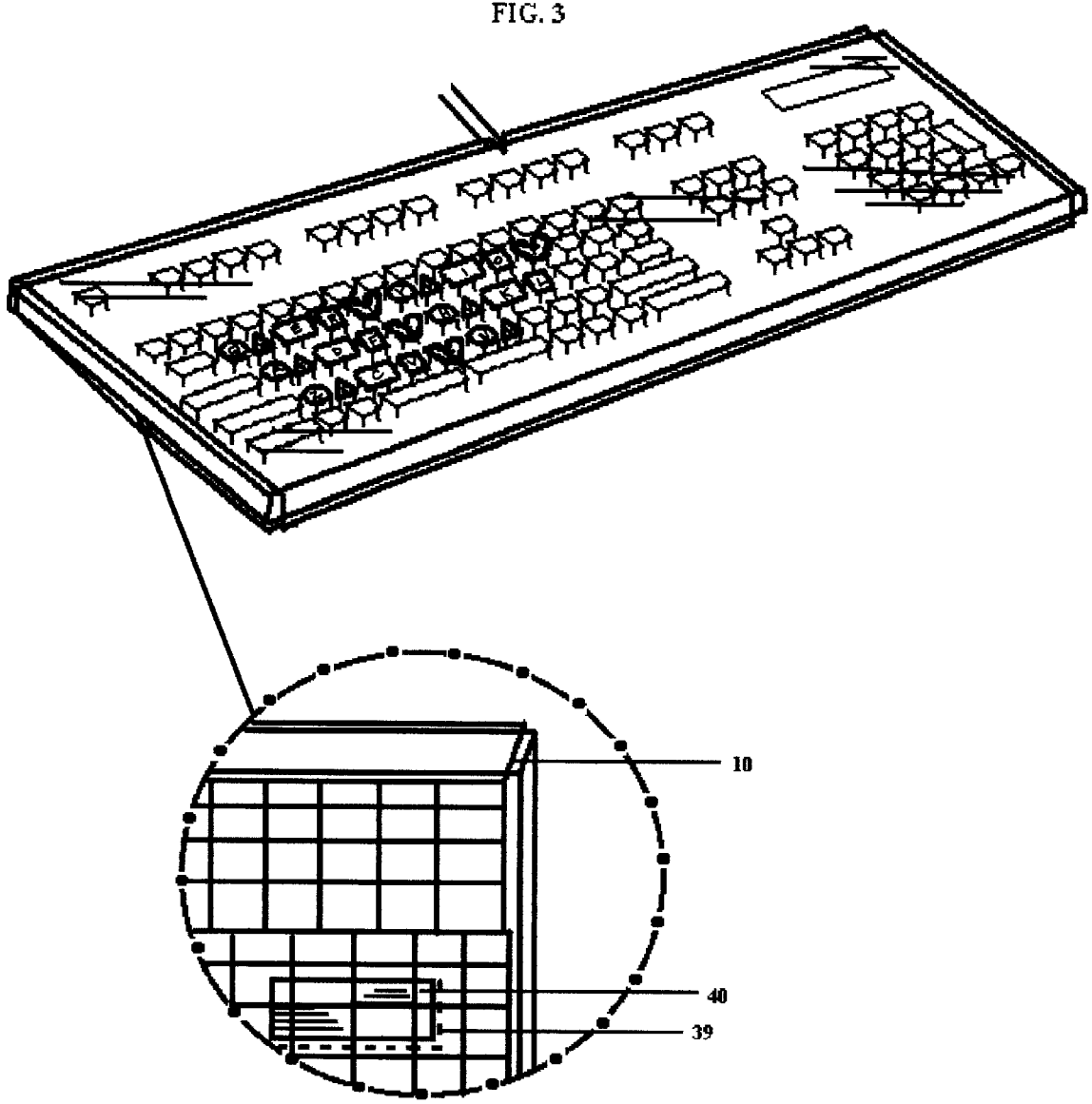
FIG. 3 is a perspective view of the jacket with the key replacements and the velcro strips attached on it as it is wrapped around the computer keyboard.

In FIGS. 2A and 2B, there are a total of fifty-two key replacements that are made of rubber in various colors, and are cut in various shapes. Each key replacement should have a measurement of at least five-eighths inch. Each key replacement has an enlarged English letter symbol displayed on it. Twenty-six of them have uppercase letters as in FIG. 2A. The other twenty-six have lowercase letters as in FIG. 2B. Attached permanently to the bottom surface of each key replacement is a strip of tiny hooks. Each measures the same as the adhesive pile strips 11 that are attached permanently on the middle left section of the top surface of the jacket.

To use the jacket, first select the set of key replacements to be used. Attach the strip of tiny hooks behind each key replacement to the adhesive pile strips 11 that are on the middle left section of the top surface of the jacket with the top surface of the key replacement showing the letter it represents. Arrange the key replacements in the same way as the letters on the keyboard are arranged.

In the first row, starting from the left are: yellow circle with Q 13a/q 13b; yellow triangle with W 14a/w 14b; yellow rectangle with E 15a/e 15b; yellow square with R 16a/r 16b; yellow heart with T 17a/t 17b; blue circle with Y 18a/y 18b; blue triangle with U 19a/u 19b; blue rectangle with I 20a/i 20b; blue square with O 21a/o 21b; and blue heart with P 22a/p 22b. In the second row, from the left are: green circle with A 23a/a 23b; green triangle with S 24a/s 24b; green rectangle with D 25a/d 25b; green square with F 26a/f 26b; green heart with G 27a/g 27b; orange circle with H 28a/h 28b; orange triangle with J 29a/j 29b; orange rectangle with K 30a/k 30b; and orange square with L 31a/l 31b. In the third row, from the left are: red circle with Z 32a/z 32b; red triangle with X 33a/x 33b; red rectangle with C 34a/c 34b; red square with V 35a/v 35b; red heart with B 36a/b 36b; purple circle with N 37a/n 37b; and purple triangle with M 38a/m 38b. Assignment of colors and shapes may be changed as long as the letters of the same hand keys and row take the same color and varying shapes.

Then spread the jacket on the keyboard with the top surface displaying the key replacements on top of their corresponding letter keys. The rubber pads 12 attached on the back side of the jacket should touch the center of each key's surface.

Once the key replacements are in place, fold down the upper edge of the jacket towards the bottom of the keyboard. Get a pair of the adhesive pile strips 39 that goes with the kit, and peel off the cover of their tapes that are attached on their back side. Place and stick one adhesive pile strip 39 on the lines at the upper edge of the jacket, and the other on the same lines at the right upper edge. Afterwards, fold down the lower edge of the jacket over the upper edge. Be sure the back side of the jacket's lower edge is touching the adhesive pile strips 39 on the upper edge. This time, get a pair of the strips of tiny hooks 40. Peel off the cover of their tapes that are on their back side, and stick the strips with tiny hooks 40 on the lines at the left and right ends of the lower edge that are on the bottom surface of the jacket. The strips of tiny hooks 40 on the lower edge should be exactly aligned with the adhesive pile strips 39 on the upper edge of the jacket.

To lock the jacket, press the strips of tiny hooks 40 on the lower edge against the adhesive pile strips 39 on the upper edge until they are fastened together.

In pressing the key replacements, press only the center of each until the rubber pad 12 under it touches the key's surface.

To remove the jacket from the keyboard, simply detach with care the tiny hooks that are on the strips 40 of the lower edge from the adhesive pile that are on the strips 39 of the upper edge.

To use as an activity board, wrap the jacket around any board that has the same size as a standard keyboard and attach the replacement keys in any order suited to meet the purpose of the activity.

What I claim as my invention is:

1. A computer keyboard enhancement kit comprising a transparent plastic jacket that has a width similar to that of a standard QWERTY computer keyboard, and a length thrice of a standard QWERTY computer keyboard said jacket has top and bottom surfaces, said top and bottom surfaces include a plurality of rows of adhesive pile strips and of rubber pads respectively and preprinted reticulated lines on upper front and lower back edges of the surfaces, said plurality of rows of adhesive pile strips and of rubber pads are permanently attached to the mid-left section of the top surface and to the mid-right section of the bottom surface respectively, said mid sections of both surfaces are between said preprinted reticulated lines on the upper front and lower back edges of the surfaces, and said upper and lower edges of the surfaces are syncline and straight respectively.

2. A computer keyboard enhancement kit as in claim 1, further comprising detached adhesive pile strips and strips of tiny hooks attached permanently to the edges of the plastic jacket after measuring the jacket against the computer keyboard to be used.

3. A computer keyboard enhancement kit as in claim 1, further comprising two sets of detachable key replacements made of rubber materials whose surfaces are enlarged relative to those of the keys of a standard keyboard, said rubber materials are of various colors and formed as cutouts in various shapes, said cutouts display a specific letter on their top surface, and follow a specific pattern scheme wherein only letters of the same hand and row keys have cutouts with the same color but of varied shapes, said letters are in either uppercase or lowercase form on the top surface of every cutout, said every cutout has a bottom surface that holds a strip of tiny hooks attached permanently to it.

\* \* \* \* \*

UNITED STATES PATENT AND TRADEMARK OFFICE
CERTIFICATE OF CORRECTION

PATENT NO. : 6,382,854 B2  Page 1 of 1
DATED : May 7, 2002
INVENTOR(S) : Rossana Uy Morelos It is certified that error appears in the above-identified patent and that said Letters Patent is hereby corrected as shown below:

<u>Title page,</u>
Item [76], should read:
-- [76] Inventor: Rossana Uy Morelos, 13150 Pomerado Rd. #130, Poway, CA (US) 92064 --

<u>Column 1,</u>
Line 5, should read: -- This application claims benefit of provisional application no. 60/172,179 filed Dec. 17, 1999. --

<u>Column 3,</u>
Lines 37-45, should read: -- As shown in the drawings in FIGS. 1A and 1B, a computer keyboard enhancement kit includes a bib-shaped jacket made of transparent plastic sheet 10 having the width of a standard QWERTY computer keyboard and the length thrice of it; with reticulated lines preprinted on its upper front and lower back edges; and has on the middle left portion of its top surface twenty-six adhesive pile strips 11 attached permanently, each measuring approximately one-fourth inch; and on the middle right portion of its bottom --

Signed and Sealed this

Twenty-fourth Day of December, 2002

JAMES E. ROGAN
*Director of the United States Patent and Trademark Office*